US008120595B2

(12) United States Patent
Kukulj et al.

(10) Patent No.: US 8,120,595 B2
(45) Date of Patent: Feb. 21, 2012

(54) WAVEGUIDE MATERIALS FOR OPTICAL TOUCH SCREENS (75) Inventors: Dax Kukulj, Kingston (AU); Graham Roy Atkins, Kaleen (AU)

(73) Assignee: RPO Pty Limited, Acton, ACT (AU)

( * ) Notice: Subject to any disclaimer, the term of this patent is extended or adjusted under 35 U.S.C. 154(b) by 1172 days.

(21) Appl. No.: 11/742,887

(22) Filed: May 1, 2007

(65) Prior Publication Data

US 2007/0285406 A1 Dec. 13, 2007

Related U.S. Application Data (60) Provisional application No. 60/796,666, filed on May 1, 2006.

(51) Int. Cl.
G06F 3/042 (2006.01)
(52) U.S. Cl. ........................................ 345/176; 345/173
(58) Field of Classification Search .................. 345/176, 345/178, 173, 156
See application file for complete search history.

(56) References Cited

U.S. PATENT DOCUMENTS

| 265,184 | A | 9/1882 | Titzel et al. |
|---|---|---|---|
| 3,478,220 | A | 11/1969 | Milroy |
| 3,673,327 | A | 6/1972 | Johnson et al. |
| 3,935,133 | A | 1/1976 | Van Leuwen et al. |
| 4,325,633 | A | 4/1982 | Gardner |
| 4,609,252 | A | 9/1986 | Wong et al. |
| 4,749,245 | A | 6/1988 | Kawatsuki et al. |
| 4,824,522 | A | 4/1989 | Baker et al. |
| 4,828,359 | A | 5/1989 | Ueba et al. |
| 4,988,983 | A | 1/1991 | Wehrer |
| 5,062,680 | A | 11/1991 | Imamura et al. |
| 5,155,354 | A | 10/1992 | Hardy, Jr. et al. |
| 5,230,990 | A | 7/1993 | Iwasaki et al. |
| 5,265,184 | A | 11/1993 | Lebby et al. |
| 5,292,620 | A | 3/1994 | Booth et al. |
| 5,402,514 | A | 3/1995 | Booth et al. |
| 5,534,101 | A | 7/1996 | Keyworth et al. |
| 5,914,709 | A | 6/1999 | Graham et al. |
| 6,054,253 | A | 4/2000 | Fardad et al. |
| 6,181,842 | B1 | 1/2001 | Francis et al. |
| 6,236,774 | B1 | 5/2001 | Lackritz et al. |

(Continued)

FOREIGN PATENT DOCUMENTS

CN 1345421 4/2002

(Continued)

OTHER PUBLICATIONS

Eldada, et al , "Advances in Polymer Integrated Optics", *IEEE Journal of Selected Topics in Quantum Electronics*, vol. 6, No. 1, pp. 54-68, Jan./Feb. 2000.

(Continued)

Primary Examiner — Nitin Patel
(74) Attorney, Agent, or Firm — Miller, Matthias & Hull, LLP (57) ABSTRACT This invention relates to polymeric optical materials suitable for use in waveguide-based optical touch screen sensors. In particular, the materials should have a glass transition temperature (Tg) below a minimum operating temperature of the touch screen device. Preferably, waveguides composed of the materials are fabricated on polymer substrates, so that the waveguide assembly is flexible. In this case, the materials should have Tg below a Tg of the polymer substrate.

19 Claims, 6 Drawing Sheets

U.S. PATENT DOCUMENTS

| | | | |
|---|---|---|---|
| 6,308,001 B1 | 10/2001 | Nair et al. | |
| 6,316,589 B1 | 11/2001 | You et al. | |
| 6,327,415 B1 | 12/2001 | Koyano et al. | |
| 6,351,260 B1 | 2/2002 | Graham et al. | |
| 6,549,195 B2 * | 4/2003 | Hikida et al. | 345/173 |
| 6,555,288 B1 | 4/2003 | Xu et al. | |
| 6,603,917 B2 | 8/2003 | Takayama et al. | |
| 6,611,299 B1 * | 8/2003 | Fujii et al. | 349/12 |
| 6,685,921 B2 | 2/2004 | Lawlor | |
| 6,724,968 B2 * | 4/2004 | Lackritz et al. | 385/131 |
| 6,727,337 B2 | 4/2004 | Friedrich | |
| 6,800,724 B2 | 10/2004 | Zha et al. | |
| 6,818,721 B2 | 11/2004 | Zha et al. | |
| 6,842,545 B2 * | 1/2005 | Lackritz et al. | 385/14 |
| 6,965,006 B2 | 11/2005 | Zha | |
| 7,006,081 B2 * | 2/2006 | Kent et al. | 345/177 |
| 7,030,039 B2 | 4/2006 | Gurer et al. | |
| 7,099,553 B1 | 8/2006 | Graham et al. | |
| 7,352,940 B2 | 4/2008 | Charters et al. | |
| 2001/0031269 A1 | 10/2001 | Arnaud | |
| 2002/0088930 A1 | 7/2002 | Graham et al. | |
| 2002/0104691 A1 * | 8/2002 | Kent et al. | 178/18.04 |
| 2003/0213624 A1 * | 11/2003 | Cross et al. | 178/18.06 |
| 2004/0201579 A1 | 10/2004 | Graham | |
| 2004/0209784 A1 | 10/2004 | Hardman et al. | |
| 2004/0239641 A1 * | 12/2004 | Takahata et al. | 345/173 |
| 2005/0089298 A1 | 4/2005 | Maxwell et al. | |
| 2005/0201681 A1 | 9/2005 | Payne | |
| 2006/0001653 A1 | 1/2006 | Smits | |
| 2006/0002655 A1 | 1/2006 | Smits | |
| 2007/0009674 A1 * | 1/2007 | Okubo et al. | 428/1.1 |

FOREIGN PATENT DOCUMENTS

| | | |
|---|---|---|
| EP | 717476 A | 6/1996 |
| GB | 2263765 A | 8/1993 |
| JP | 55029825 A | 3/1980 |
| JP | 3236014 A | 10/1991 |
| WO | WO-01/91043 A | 11/2001 |
| WO | WO-02/095456 | 11/2002 |
| WO | WO-03/065091 A | 8/2003 |
| WO | WO-2005/031392 A | 4/2005 |
| WO | WO-2006/081633 A1 | 8/2006 |

OTHER PUBLICATIONS

W.A. McDonald, *Journal of Materials Chemistry*, vol. 14, pp. 4-10, (2004).

Y.P. Li and C H. Henry, "Silica-based Optical Integrated Circuits", *IEEE Proc Optoelectronics*, vol. 143(5), pp. 263-280, (1996).

C F Kane and R R. Krchnavek, "Benzocyclobutene Optical Waveguides", *IEEE Photonics Technology Letters*, vol. 7, pp. 535-537, (1995).

First Office Action issued by Chinese Patent Office in counterpart Chinese Patent Application for Invention No. 200780015720.3.

International Search Report and Written Opinion received in patent application No. PCT/AU2007/000569, dated May 31, 2007.

International Search Report received in PCT Application No. PCT/AU2006/000152, dated May 11, 2006.

* cited by examiner

WAVEGUIDE MATERIALS FOR OPTICAL TOUCH SCREENS

CROSS-REFERENCE TO RELATED APPLICATION

This application is a non-provisional claiming priority under 35 USC §119(e) to U.S. provisional application Ser. No. 60/796,666 filed on May 1, 2006.

INTRODUCTION

The invention relates to polymeric optical materials that are suitable for use in waveguide-based optical touch screen sensors

BACKGROUND ART

Any discussion of the prior art throughout the specification should in no way be considered as an admission that such prior art is widely known or forms part of common general knowledge in the field.

Touch screen input devices or sensors for computers and other consumer electronics devices such as mobile phones, personal digital assistants (PDAs) and hand-held games are highly desirable due to their extreme ease of use. In the past, a variety of approaches have been used to provide touch screen input devices. The most common approach uses a flexible resistive overlay, although the overlay is easily damaged, can cause glare problems, and tends to dim the underlying screen, requiring excess power usage to compensate for such dimming. Resistive devices can also be sensitive to humidity, and the cost of the resistive overlay scales as the square of the perimeter. Another approach is the capacitive touch screen, which also requires an overlay. In this case the overlay is generally more durable, but the glare and dimming problems remain.

In yet another common approach, a matrix of infrared light beams is established in front of a display, with a touch detected by the interruption of one or more of the beams. Such "optical" touch screens have long been known (U.S. Pat. Nos. 3,478,220; 3,673,327), with the beams generated by arrays of optical sources such as light emitting diodes (LEDs) and detected by corresponding arrays of detectors (such as phototransistors) They have the advantage of being overlay-free and can function in a variety of ambient light conditions (U.S. Pat. No. 4,988,983), but have a significant cost problem in that they require a large number of source and detector components, as well as supporting electronics. Since the spatial resolution of such systems depends on the number of sources and detectors, this component cost increases with resolution.

An alternative optical touch screen technology, based on integrated optical waveguides, is disclosed in U.S. Pat. Nos. 6,351,260, 6,181,842 and 5,914,709, and in U.S. Patent Application Nos. 2002/0088930 and 2004/0201579, the contents of which are incorporated into this specification by way of cross-reference. The basic principle of such a device, with one particular waveguide layout, is shown schematically in FIG. 1. In this optical touch screen sensor design, integrated optical waveguides 10 conduct light from a single optical source 11 to in-plane lenses 12 that launch an array of light beams 13 across an input area 14. The light is collected by a second set of in-plane lenses 15 and integrated optical waveguides 16 at the other side of the input area, and conducted to a position-sensitive (ie. multi-element) detector 17. A touch event (eg. by a finger or stylus) cuts one or more of the beams of light and is detected as a shadow, with position determined from the particular beam(s) blocked by the touching object. That is, the position of any physical blockage can be identified in one dimension by the presence of a black spot, enabling user feedback to be entered into the device. Preferably, the device also includes external vertical collimating lenses (VCLs, not shown in FIG. 1) adjacent to the in-plane lenses 12, 15 on both sides of the input area 14, to collimate the light beams 13 in the direction perpendicular to the plane of the input area. In a variation disclosed in U.S. Pat. No. 7,099,553, the contents of which are incorporated herein by way of cross-reference, the array of integrated optical waveguides 10 on the transmit side may be replaced by a single optical waveguide in the form of a light pipe with a plurality of reflective facets.

Figure 1:
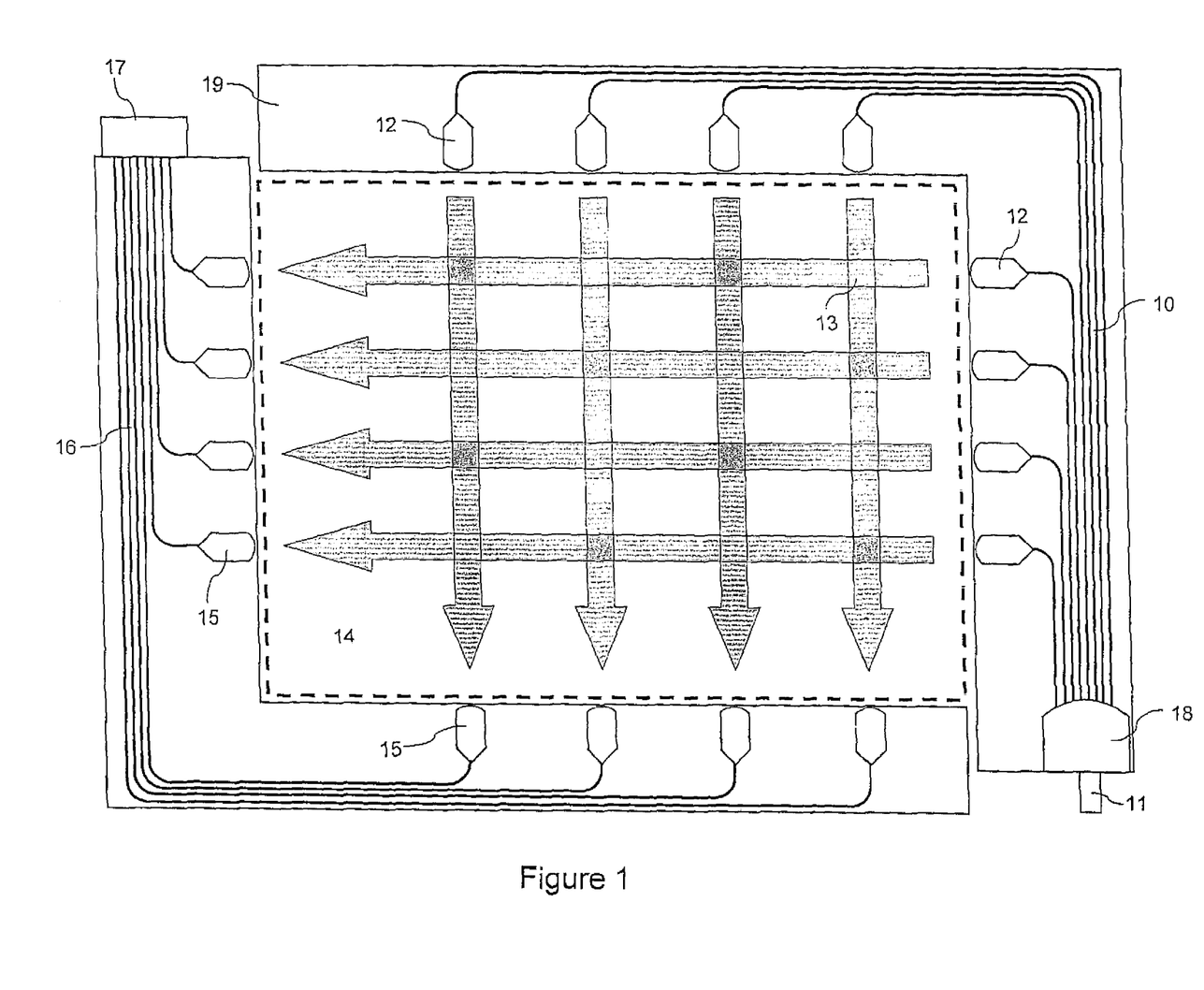
FIG. 1 illustrates the operation of a waveguide-based optical touch screen sensor.

The touch screen sensors are usually two dimensional and rectangular, with two arrays (X, Y) of transmit waveguides along adjacent sides of the screen, and two corresponding arrays of receive waveguides along the other two sides of the screen. As part of the transmit side, in one embodiment a single optical source 11 (such as an LED or a vertical cavity surface emitting laser (VCSEL)) launches light (eg. via a 1×N tree splitter 18) into a plurality of waveguides 10 that form both the X and Y transmit arrays. The X and Y transmit waveguides are usually arranged on an L shaped substrate 19, and likewise for the X and Y receive waveguides, so that a single source and a single position-sensitive detector can be used to cover both X and Y dimensions. However in alternative embodiments, a separate source and/or detector may be used for each of the X and Y dimensions. On each side the arrays of waveguides and lenses are positioned within the bezel of the screen, and to minimise the width of the bezel, it is desirable for the transmit and receive arrays to be as narrow as possible. This is especially important for small devices such as mobile phones.

A further advantage of this configuration is that all beams are detected simultaneously, enabling much faster scanning speeds compared to more conventional configurations with arrays of paired sources and detectors, where the sources and/or detectors are sequentially activated to determine if any source/detector pathways are blocked. In this waveguide-based configuration, spatial resolution can be increased simply by adding more waveguides, without affecting the source/detector component cost or the scanning speed.

Key components of waveguide-based optical touch screen sensors are the optical waveguides themselves which, as disclosed in U.S. Pat. No. 5,914,709, are in the form of arrays of waveguides integrated onto a substrate. Such integrated optical waveguides are well known in the art, and typically consist of a patterned, light guiding core layer (of refractive index $n_1$) surrounded by a cladding material (of refractive index $n_2$, where $n_2 < n_1$) and mounted on a mechanically robust substrate. Light propagating along each waveguide is guided within the core by the refractive index difference between core and cladding. The core region is generally elongated in the propagation direction, is square or rectangular in cross section, and is usually surrounded by cladding material, which can be considered to consist of a lower cladding (in contact with the bottom face of the core) and an upper cladding (in contact with the other three faces). However this need not necessarily be the case, and as disclosed in U.S. patent application No. US 2005/0089298A1, incorporated herein by reference in its entirety, there are some situations where it is advantageous for at least one portion of the core to be flee of contact with cladding material on at least one face. Also, the lower cladding may be omitted if the substrate material has the appropriate transparency and refractive index.

To be suitable for use in consumer electronics devices incorporating touch screen sensors, optical waveguides and the materials and processes used to fabricate them have to satisfy a number of requirements. Obviously they need to be transparent at the operating wavelength, typically in the near infrared near 850 nm. With this as a given, the materials must firstly be competitive in price, ie. amenable to an inexpensive fabrication process. Secondly, they must be reliable, with a high degree of resistance to environmental challenges such as mechanical stress (bending, crushing and dropping of devices), thermal stress (extremes of temperature and rapid temperature change) and chemical stability (water and other liquids, vapours and ambient ultraviolet light). Thirdly, they must be compatible with the touch screen assembly as a whole.

Integrated optical waveguides have typically been produced from rigid materials such as silicate glass, on rigid substrates such as silicon wafers or glass wafers, and fabricated using semiconductor style processing techniques, namely, chemical vapour deposition, vacuum deposition, photolithography, reactive ion etching and the like. However these techniques require expensive capital equipment, and for reasons of cost and ease of fabrication, it is highly preferred to form the waveguides (and associated lenses) out of a photo-patternable polymer material. The cost advantage of polymers can be improved upon if the waveguides can be fabricated via a photolithography/wet etch process or a moulding process, because the capital cost of setting up a fabrication plant is much lower than for other waveguide patterning techniques such as reactive ion etching (RIE). U.S. Pat. No. 5,914,709 suggests the photo-patternable polymer benzocyclobutene (BCB) as the waveguide material, but does not consider the properties that a waveguide material must have to be suitable for use in touch screen sensors.

It is an object of the present invention to overcome or ameliorate at least one of the disadvantages of the prior art, or to provide a useful alternative.

SUMMARY OF THE INVENTION

Broadly, the invention provides a flexible waveguide comprising a light transmissive polymer core and a polymer substrate. Preferably, the flexible waveguide further comprises a polymer cladding in contact with at least a portion of said light transmissive core.

Preferably, the materials and thicknesses are selected in combination to allow the flexible waveguide to be bent repeatedly and reversibly with a tight bend radius.

Preferably, the glass transition temperature (Tg) of the light transmissive core is below a minimum operating temperature of a device in which the waveguide is used. It is also preferred that the Tg of the light transmissive core is below the Tg of the substrate. Most preferably, the Tg of the light transmissive core is below the Tg of the substrate and below a minimum operating temperature of a device in which the waveguide is used. The material may be selected with regard to the general operating temperatures of electronic and optical devices, or it may be selected with the operating temperature of the final device in mind. It is important that the intended operating temperature of the light guide is above the Tg of the light guide material. Certain optical parameters, such as refractive index, show non-linearity around the Tg region.

According to a first aspect the invention provides an optical waveguide used as a component of an optical touch screen sensor, the optical waveguide comprising a light guiding portion on a substrate, wherein the light guiding portion is composed of a polymer with Tg below an operating temperature of the optical touch screen sensor.

Preferably, the operating temperature of the optical touch screen sensor is at least in a range from 0° C.-50° C., and in some applications a range from 0° C.-35° C. may be acceptable.

The light guiding portion is advantageously composed of a polymer with Tg below 100° C., preferably below 50° C., more preferably below 25° C., and most preferably below 10° C.

In preferred embodiments, the substrate is substantially flexible, and may be for instance a polymer substrate. Preferably the light guiding portion is composed of a polymer with Tg lower than a Tg of the polymer substrate. Advantageously, the optical waveguide can be bent repeatedly and reversibly through 180° with a radius of curvature that is less than 100 cm, preferably less than 10 cm, more preferably less than 1 cm, and most preferably less than 2 mm.

The light guiding portion of the optical waveguide may, in one embodiment, be formed by depositing a curable liquid polymer material onto the substrate, and curing it to form a cross-linked polymer material.

It is highly preferred that the curable liquid polymer material be substantially non-volatile, and in particular be free of any volatile component such as a solvent. Volatility can be determined by many parameters, but one indication of a non-volatile material is that it is free of any components boiling below about 175° C. at 760 mmHg, preferably free of any components boiling below about 225° C. at 760 mmHg, and more preferably free from any components boiling below about 275° C. at 760 mmHg. Another indication of a non-volatile material is that it has a vapour pressure of less than 0 5 mmHg at 20° C., preferably less than 0.1 mmHg at 20° C., and most prefer ably less than 0.01 mmHg at 20° C. Yet another indication of a non-volatile material is that its vapour pressure exceeds 1 mmHg only when the temperature exceeds 25° C., preferably when the temperature exceeds 50° C., and most preferably when the temperature exceeds 75° C.

Preferably, the curable liquid polymer material comprises a siloxane polymer. The curable liquid polymer material may be cured by any means, preferably a UV initiated free radical polymerisation, or in an alternative preferred embodiment, a UV lithography/wet etch method. In another preferred embodiment, the curable liquid polymer material may be cured in a moulding method. One example of a curable siloxane polymer is disclosed in U.S. Pat. No. 6,818,721, owned by the same assignee and incorporated herein by reference in its entirety.

Preferably, the polymer light guiding portion has a thickness in the range of about 0.5 µm to 250 µm in thickness, more preferably 3 µm to 50 µm in thickness and most preferably 5 µm to 25 µm in thickness.

If the waveguide substrate comprises a polymer, it preferably has a Tg above 80° C., more preferably above 150° C. and most preferably above 350° C.

The polymer substrate may comprise any suitable polymer material, for example a polycarbonate, a polysulfone, a polyimide or polyethylene terephthalate. Any suitable thickness of substrate may be employed. Usually the substrate thickness is in the range of about 25 µm to 1 mm in thickness, preferably 75 µm to 250 µm in thickness, and most preferably about 175 µm in thickness.

In alternative preferred embodiments, the optical waveguide of the present invention further comprises a lower cladding between said polymer light guiding portion and said substrate. Preferably, the lower cladding and the polymer light guiding portion are of substantially similar composition, but are not of an identical composition. A lower cladding has a different and lower index of refraction than a core light guiding portion.

In further alternative preferred embodiments, the optical waveguides of the present invention further comprise an upper cladding in contact with at least a portion of said polymer light guiding portion. Preferably, the upper cladding and the polymer light guiding portion are of substantially similar composition, but are not of identical composition. An upper cladding has a different and lower index of refraction than a core light guiding portion.

The invention also provides devices including an optical waveguide according to the first aspect. The device may be for example an optical touch sensor, which may be used, for instance, in a computer, game or telecommunication device or a hybrid thereof.

According to a second aspect, the invention provides an optical waveguide when used as a component of an optical touch screen sensor, the waveguide comprising a light guiding portion on a substrate, wherein the light guiding portion is composed of a polymer with Tg below an operating temperature range of the optical touch screen sensor and wherein the light guiding portion is formed by depositing a substantially non-volatile curable liquid siloxane polymer onto a substrate, and curing it to form a cross-linked siloxane polymer.

Preferred embodiments of the second aspect mirror those of the first aspect. In particular it is preferred that the light guiding portion is composed of a polymer with Tg below 100° C., more preferably below 50° C., still more preferably below 25° C., and most preferably below 10° C.

According to a third aspect, the invention provides an apparatus, comprising a light source; a transmission waveguide portion optically coupled to receive light from said light source, said transmission waveguide portion producing a first set of light beams that propagate in a first direction; a reception waveguide portion spaced apart from said transmission waveguide portion in the first direction, said reception waveguide portion receiving said first set of light beams, an input area between sad transmission waveguide portion and said reception waveguide portion; a light detector optically coupled to said reception waveguide portion and including one or more light detecting elements that substantially simultaneously detect the distribution of the light in each of said first set of light beams after said light beams have traversed said input area; wherein at least one of said transmission waveguide portion and said reception waveguide portion comprises a light guiding portion and a substrate; and wherein said light guiding portion is composed of a polymer with Tg below an operating temperature of the apparatus.

The light transmission portion may comprise a single waveguide, for example a light pipe with a plurality of reflective facets. The set of beams may be a single sheet of light.

The light guiding portion is advantageously composed of a polymer with Tg below 100° C., preferably below 50° C., more preferably below 25° C., and most preferably below 10° C. Most preferably, the polymer light guiding portion has a Tg below an operating temperature range of the apparatus. The operating temperature of the apparatus may be any operating temperature permitted by the Tg of the polymer. In one embodiment, an operating temperature of an apparatus is in a range of about 0° C.-50° C.; alternatively, in one embodiment, an operating temperature of an apparatus is in a range of about 0° C.-35° C.

In preferred embodiments, a substrate is substantially flexible, and may be for instance a polymer substrate. Preferably a light guiding portion is composed of a polymer with Tg lower than a Tg of the polymer substrate. Advantageously, the transmission waveguide portion or reception waveguide portion can be bent repeatedly and reversibly through 180° with a radius of curvature that is less than 100 cm, preferably less than 10 cm, more preferably less than 1 cm, and most preferably less than 2 mm.

The light guiding portion may, in one embodiment, be formed by depositing a curable liquid polymer material onto the substrate, and curing it to form a cross-linked polymer material. It is highly preferred that the curable liquid polymer material be substantially non-volatile, and in particular be free of any volatile component such as a solvent.

Preferably, the curable liquid polymer material comprises a siloxane polymer. The curable liquid polymer material may be cured by any means, preferably a UV initiated free radical polymerisation, or in an alternative preferred embodiment, a UV lithography/wet etch method. In another preferred embodiment, the curable liquid polymer material may be cured in a moulding method. Preferably, the polymer light guiding portion is 0.5 µm to 250 µm in thickness, more preferably 3 µm to 50 µm in thickness and most preferably 5 µm to 25 µm in thickness.

If the waveguide substrate comprises a polymer, it preferably has a Tg above 80° C., more preferably above 150° C. and most preferably above 350° C. The polymer substrate may comprise any suitable polymer material, for example a polyealbonate, a polysulfone, a polyimide or polyethylene terephthalate.

Any suitable thickness of substrate may be employed. Usually the substrate is in the range of 25 µm to 1 mm in thickness, preferably 75 µm to 250 µm in thickness, and most preferably about 175 µm in thickness.

In alternative preferred embodiments, the apparatus of the present invention further comprises a lower cladding between said polymer light guiding portion and said substrate. Preferably, the lower cladding and the polymer light guiding portion are of substantially similar composition, but are not of an identical composition.

In further alternative preferred embodiments, the apparatus of the present invention further comprises an upper cladding in contact with at least a portion of said polymer light guiding portion. Preferably, the upper cladding and the polymer light guiding portion are of substantially similar composition, but are not of identical composition.

Preferably, an apparatus is an input device for an electronic device, wherein an input area is produced between said transmission waveguide portion and said reception waveguide portion. In preferred embodiments, a user provides input to an electronic device by interacting with an input area. For instance, a user interacts with an input area with a finger or a stylus. More particularly, an apparatus may be in the form of an optical touch screen sensor, or an apparatus may be in the form of a computer, game or telecommunication device or a hybrid thereof.

Preferably, a transmission waveguide portion additionally produces a second set of light beams that propagates in a second direction, different from said first direction; and said reception waveguide portion additionally receives said second set of light beams. Preferably, the second direction is perpendicular to the first direction.

According to a fourth aspect, the invention provides an input device for an electronic device, comprising: at least one light source; a light detector to detect light intensity at a plurality of light detecting elements; an input area defining a plane; and a lithographically defined waveguide structure including a plurality of waveguides divisible into one or more sets of waveguides, wherein said light source couples light into a first set of waveguides of said waveguide structure, said first set of waveguides directs the light coupling into the waveguides to produce a first grid of light beams, and said first grid of light beams traverses the input area in a first direction and is then directed to the light detecting elements of said light detector by a second set of waveguides of said waveguide structure; wherein at least one of said first set and said second set of waveguides comprises a light guiding portion and a substrate; wherein said light guiding portion is composed of a polymer with Tg below an operating temperature range of the input device.

Preferably, the operating temperature of the input device is in the range 0° C.-50° C., and more preferably in the range 0° C.-35° C. The light guiding portion is advantageously composed of a polymer with Tg below 100° C., preferably below 50° C., more preferably below 25° C., and most preferably below 10° C.

In preferred embodiments, the substrate is substantially flexible, and may be for instance a polymer substrate. Preferably the light guiding portion is composed of a polymer with Tg lower than a Tg of the polymer substrate. Advantageously, the at least one of said first set and said second set of waveguides can be bent repeatedly and reversibly through 180° with a radius of curvature that is less than 100 cm, preferably less than 10 cm, more preferably less than 1 cm, and most preferably less than 2 mm.

The light guiding portion may, in one embodiment, be formed by depositing a curable liquid polymer material onto the substrate, and curing it to form a cross-linked polymer material. It is highly preferred that the curable liquid polymer material be substantially non-volatile, and in particular be free of any volatile component such as a solvent. Preferably, the curable liquid polymer material comprises a siloxane polymer. The curable liquid polymer material may be cured by any means, preferably a UV initiated free radical polymerisation, or in an alternative preferred embodiment, a UV lithography/wet etch method In another preferred embodiment, the curable liquid polymer material may be cured in a moulding method Preferably, the polymer light guiding portion is 0.5 μm to 250 μm in thickness, more preferably 3 μm to 50 μm in thickness and most preferably 5 μm to 25 μm in thickness.

If the waveguide substrate comprises a polymer, it preferably has a Tg above 80° C., more preferably above 150° C. and most preferably above 350° C. The polymer substrate may comprise any suitable polymer material, for example a polycarbonate, a polysulfone, a polyimide or polyethylene terephthalate.

Any suitable thickness of substrate may be employed. Usually the substrate is 25 μm to 1 mm in thickness, preferably 75 μm to 250 μm in thickness, and most preferably about 175 μm in thickness.

In alternative preferred embodiments, the input device of the present invention further comprises a lower cladding between said polymer light guiding portion and said substrate. Preferably, the lower cladding and the polymer light guiding portion are of substantially similar composition, but are not of an identical composition.

In further alternative preferred embodiments, the input device of the present invention further comprises an upper cladding in contact with at least a portion of said polymer light guiding portion. Preferably, the upper cladding and the polymer light guiding portion are of substantially similar composition, but are not of an identical composition.

In preferred embodiments, a user provides input to an electronic device by interacting with an input area. For instance, a user may interact with the input area with a finger or a stylus. More particularly, an input device may be in the form of an optical touch screen sensor, and an electronic device may be in the form of a computer, game or telecommunication device or a hybrid thereof.

In another preferred embodiment, an input device further comprises a third set of waveguides of said waveguide structure and a fourth set of waveguides of said waveguide structure, wherein said light source couples light into said third set of waveguides, said third set of waveguides directs the light coupling into the waveguides to produce a second grid of light beams, and said second grid of light beams traverses the input area in a second direction, different from said first direction, and is then directed to the light detecting elements of said light detector by said fourth set of waveguides of said waveguide structure.

Preferably, at least one of said third set and said fourth set of waveguides comprises a light guiding portion and a substrate; wherein said light guiding portion is composed of a polymer with Tg below an operating temperature of the input device. The input area may be any shape, but is preferably rectangular. Preferably, the second direction is perpendicular to said first direction.

DESCRIPTION OF FIGURES

The invention will now be described, by way of example only, with reference to the accompanying drawings in which.

DETAILED DESCRIPTION OF THE INVENTION

Figure 2A:
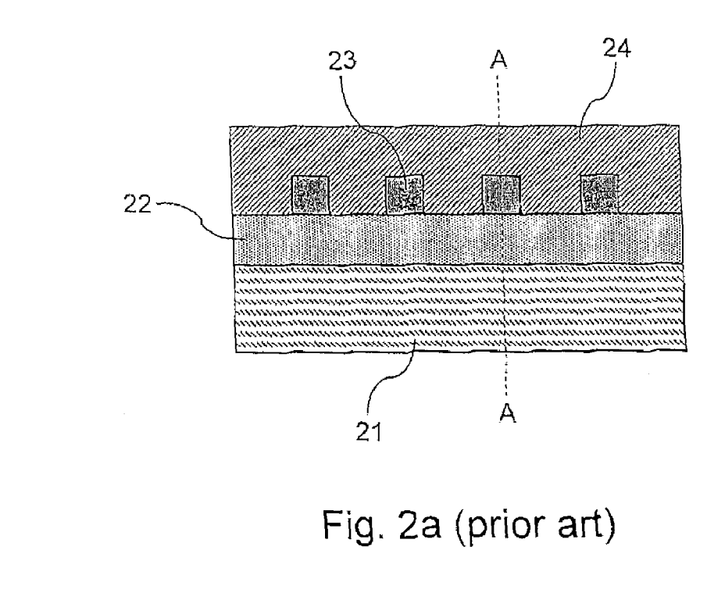
FIGS. 2a and 2b show end and side views of a typical array of integrated optical waveguides.

Optical touch sensors as described in U.S. Pat. Nos. 5,914,709, 6,181,842 and 6,351,260 depend on having arrays of integrated optical waveguides to distribute and collect the matrix of light beams used to sense a touch event. Integrated optical waveguides typically consist of a patterned, light guiding core layer (of refractive index $n_1$) surrounded by a cladding material (of refractive index $n_2$, where $n_2<n_1$) and mounted on a suitable substrate. Light propagating along the waveguide is guided within the core by the refractive index difference between core and cladding. In a variation described in U.S. Pat. No. 7,099,553, the integrated optical waveguides of the 'transmit' side, ie those used to distribute the light, may be replaced by a single optical waveguide in the form of a light pipe, with the light beams produced for example by reflections off a plurality of facets. In a light pipe the cladding is generally air, but the light guiding principle is the same FIG. 2a shows an end view and FIG. 2b a side view through A-A of a typical array of integrated optical waveguides 20, comprising a substrate 21, a lower cladding layer 22, a plurality of light guiding cores 23 and an upper cladding layer 24. Depending on the material system, a variety of techniques are available for depositing the lower cladding, core and upper cladding layers. These include flame hydrolysis and chemical vapour deposition (eg. for glass), molecular beam epitaxy (eg. for semiconductors) and spin coating (eg, for polymers). A core layer may be patterned for example by photolithography and reactive ion etching (suitable for most materials) or by photolithography and wet etching (eg. for photo-patternable polymers), exploiting a solubility differential between exposed and unexposed material Alternatively, a polymer core layer may be patterned by a moulding or embossing process, as disclosed in U.S. Pat. Nos. 5,230,990 and 5,265,184 for example, where waveguides can be produced repeatedly once a master or mould has been obtained. Photo-curable polymers are particularly suitable for such methods, because they can be cured (ie. solidified) as required during the moulding or embossing process. In yet another alternative, with curable polymer materials the core layer may be deposited as required by a direct dispense and cure process, as disclosed in U.S. Pat. No. 5,534,101 for example. Other methods for fabricating integrated optical waveguides from polymer materials will be known to those skilled in the art.

Figure 2B:
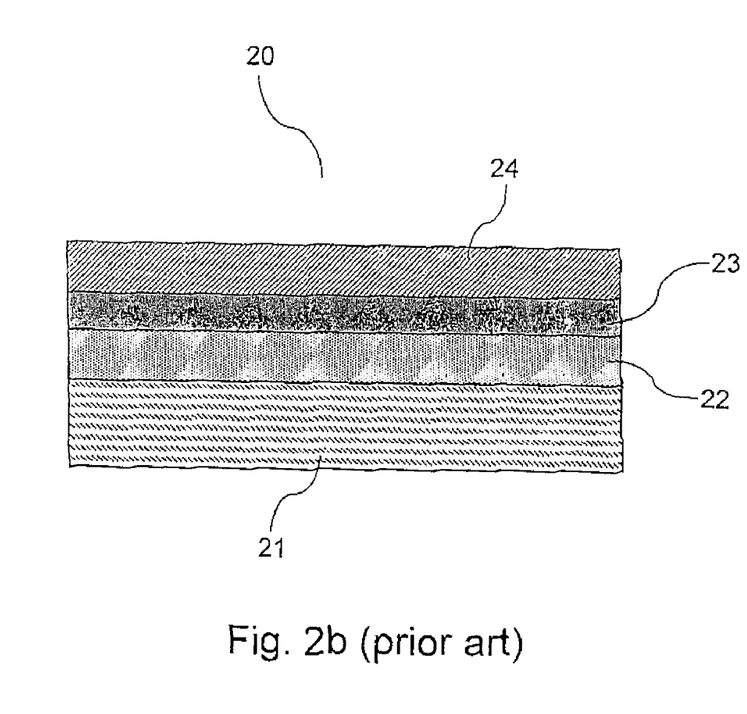

Irrespective of the method used to fabricate an integrated optical waveguide, the refractive index of the lower 22 and upper 24 cladding layers needs to be less than that of the core 23, so that light is confined within the core. Often, the lower 22 and upper 24 cladding layers have the same refractive index, so that the guided mode is symmetric, although this is not essential. If the material comprising substrate 21 is transparent and has refractive index lower than the material comprising core 23, the lower cladding layer 22 may be omitted. Typically, waveguides have a light transmissive elongated core region that is square or rectangular in cross section. The bottom face is conventionally defined as that being adjacent or nearest the substrate, the top face as the face parallel to the bottom face but furthest from the substrate, and the sides as those faces that are substantially perpendicular to the substrate In this integrated optical waveguide previously described in the art, the core is surrounded by cladding material, either the lower cladding or the upper cladding. However this need not necessarily be the case, and there are some situations where it is advantageous for at least one portion of the core to be flee of contact with cladding material on at least one face. An example of this can be seen in the waveguide-based optical touch screens of the present invention, where, as disclosed in US 2005/0089298, the in-plane lenses 12 and 14 shown in FIG. 1 have curved end-faces that preferably have an air interface.

Figure 3:
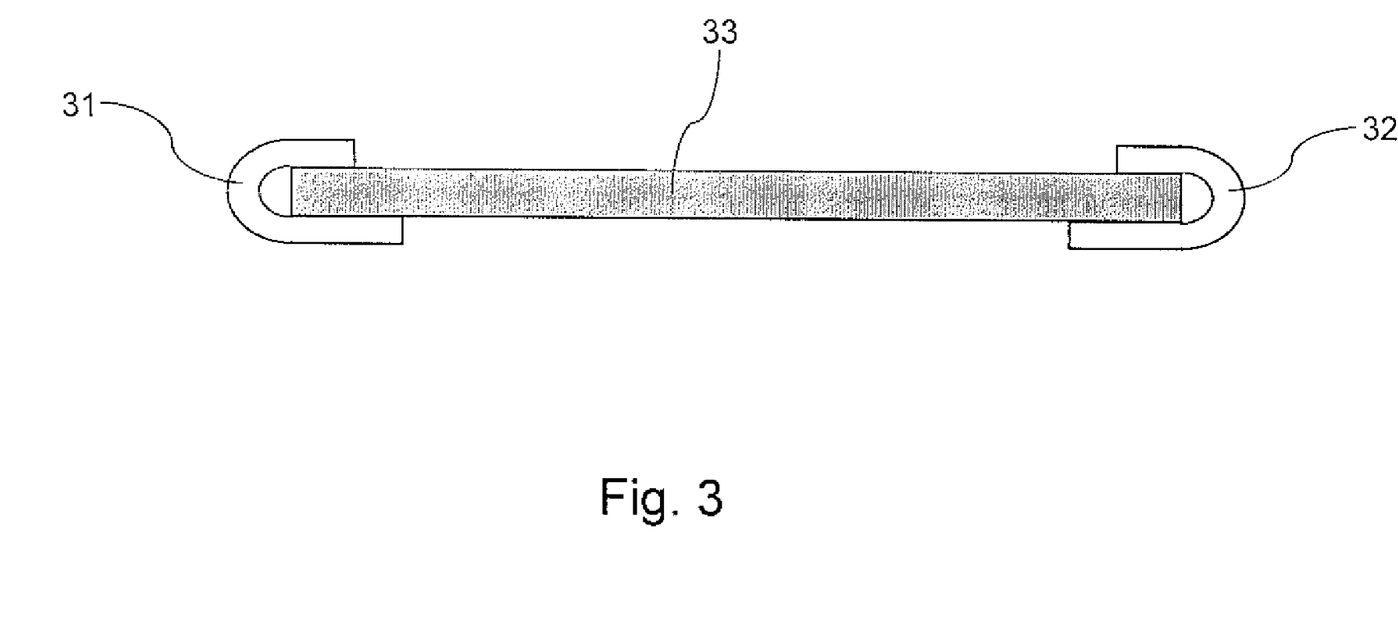
FIG. 3 illustrates the manner in which a flexible waveguide array may be folded to save space in an optical touch screen sensor.

As mentioned above, waveguide-based optical touch sensors require optical waveguides with a number of properties: they must be competitive in price; they must be robust and reliable; and they must be compatible with the touch screen assembly as a whole. This third property is not as obvious as the other two, but it is highly advantageous for the waveguide arrays to be mechanically flexible, necessitating substrates with a reasonable degree of flexibility. Waveguide arrays with a reasonable degree of flexibility are advantageous firstly for alignment with other optical components in the system, including the source, position-sensitive detector and external optical elements such as vertical collimating lenses. A second advantage is shown in FIG. 3, where a substrate 31 beating a transmit waveguide array and a substrate 32 bearing a receive waveguide array may be folded under the edge of the display 33 rather than lying flat around the periphery of the display; this is particularly important in devices such as mobile phones where space is at a premium, since it increases the available display area. While thin substrates of a rigid material such as silicon or glass may have sufficient flexibility for alignment-related adjustments, the configuration shown in FIG. 3 requires a highly flexible substrate material. Hereinafter, a substrate or substrate/waveguide assembly will be termed "substantially flexible" if it can be bent repeatedly and reversibly through 180° with a radius of curvature less than 100 cm, preferably less than 10 cm, more preferably less than 1 cm, and most preferably less than 2 mm. Substantially flexible substrate materials are preferably polymers, but other materials such as laminates or woven cloth could be used if they can be planarised, for example with a spin-on polymer layer, which could also serve as a lower cladding.

Compared to more traditional substrate materials such as silicon, polymer substrates also have benefits in terms of cost and weight. A large range of polymer substrates are available, including polyethylene terephthalate (PET), polyethylene naphthalate (PEN), polycarbonate (PC), polyvinyl chloride (PVC), polystyrene (PS), acrylates (such as PMMA) and polyimide (PI), all of which have been used in the flat panel display industry (W. A McDonald, *Journal of Materials Chemistry* vol. 14, pp 4-10, 2004). Of these, PET is by far the most widely used because it is inexpensive and widely available in large volume (for example as Melinex® or Mylar®), with high surface quality (eg smoothness). Polycarbonates and polysulfones are likewise inexpensive and widely available.

Integrated optical waveguides have most commonly been produced using materials such as silicate glass on rigid substrates like silicon wafers or glass wafers, using semiconductor style processing equipment, namely, chemical vapour deposition, vacuum deposition, photolithography, reactive ion etching etc. (Y. P. Li and C. H. Henry, 'Silica-based optical integrated circuits', *IEE Proc. Optoelectronics* vol 143(5), pp. 263-280, 1996). Such waveguides are certainly environmentally robust (except to mechanical shock), but they are expensive (mainly because of the capital equipment cost) and are generally incompatible with polymer substrates because of excessively high deposition temperatures. Also, to have a flexible waveguiding structure it is necessary for both the substrate and the waveguiding material to be flexible. Since the waveguide layers are generally much thinner than the substrate, the overall flexibility of the waveguide/substrate composite is dominated by the characteristics of the substrate material, determined by both the nature of the substrate material and its thickness. The substrate thickness will typically be in the range of 25 μm to 1 mm, whereas each waveguide layer will typically be in the range of 0.5 to 250 μm thick. For waveguide-based optical touch screen sensors the substrate thickness is preferably 75 to 250 μm, and most preferably about 175 μm, and the waveguide core layer thickness is preferably 3 to 50 μm, and most preferably 5 to 25 μm.

As explained above, it is highly preferred to form the waveguide arrays (and associated lenses) for waveguide-based optical touch screen sensors out of a photo-patternable polymer material using a photolithography/wet etch process. This is a low temperature process compatible with polymer substrates, with a simple proviso that the substrate material be relatively impervious to the solvent used for the wet etching step. The fabrication of polymer optical waveguides via photolithogiaphy/wet etch processing is well known in the art, disclosed for example in U.S. Pat. Nos. 4,609,252, 6,054,253 and 6,555,288. Alternatively, the waveguide arrays (and associated lenses) may be formed using a moulding or embossing process, as disclosed in U.S. Pat. Nos. 5,230,990 and 265,184 for example.

When selecting a polymer for a certain application, one important property among the many that needs to be considered is its glass transition temperature, Tg. Tg can be defined as a second order phase transition in heat capacity, and manifests itself as a change of slope in the rate of change of volume with temperature In terms of mechanical properties, a polymer material is rigid or "glassy" below its Tg and soft or "rubbery" above its Tg, with a more complicated "viscoelastic" region around its Tg. The mechanical properties of a polymer above Tg depend on the molecular structure, in particular, whether or not a polymer is cross-linked. A non-cross-linked polymer melts or flows above Tg (ie. it has no mechanical integrity), whereas a cross-linked polymer retains its mechanical integrity but has local freedom of movement associated with the chain segments between cross-links. Flexible substrates used for displays and polymer waveguides are advantageously composed of high Tg polymers, chosen for thermo-mechanical and environmental robustness. Typical examples are polycarbonates (Tg~150° C.), polysulfones (Tg~190° C.) and the polyimide Kapton® (Tg~350° C.), although the lower Tg material polyethylene terephthalate (eg. Melinex®, Tg~80° C.) is also used.

Since the refractive index of a polymer is largely dependent on its density, the Tg of a polymer also manifests itself as a change of slope in a plot of refractive index against temperature, and in certain cases this is a convenient means for determining Tg. It should be noted however that in a cross-linked polymer it is only the chain segments between cross-links that are free to move above Tg, so that the Tg-related change in slope may not be as dramatic as in a non-cross-linked polymer (eg. a thermoplastic such as polyethylene or PMMA), where entire chains are free to move above Tg.

Once a flexible substrate with appropriate properties (eg. cost, surface quality, Tg) is chosen, it is highly desirable for the polymer waveguide materials to conform to the mechanical properties of the substrate. In particular, since polymers are soft and rubbery above Tg, it is advantageous to use low Tg polymer waveguide materials that allow the waveguide to be flexed or bent without causing localised stress in the waveguides. If on the other hand, the waveguides are composed ot a high Tg polymer material, repeated flexing may cause a gradual build up of localised stress that can lead to micro-cracks which not only degrade optical performance, but may grow and ultimately cause mechanical failure of the waveguide layer. Using low Tg polymer waveguide materials also allows the waveguides to respond to changes in the dimensions of the substrate that may arise due to thermal expansion, absorption of moisture in high humidity environments and/or physical stretching. The Tg of the polymer waveguide materials is preferably less than 100° C., more preferably less than 50° C., still more preferably less than 25° C. and most preferably less than 10° C. It is particularly desirable for the Tg of the polymer waveguide material to be below the minimum operating temperature of the device, so that the material is always in its rubbery state.

A large number of polymer waveguide materials are known and used in the field of optical devices, the majority of which have a high glass transition temperature Tg, typically above 100° C. This means that at ambient temperatures, and at the operating temperatures of most optical devices, the waveguide polymer is in the rigid "glassy" state High Tg polymers have traditionally been favoured because of the belief that high Tg is essential for thermal and mechanical stability, both long term during device operation and for short excursions during processing, e.g. to ~250° C., encountered during packaging (i.e soldering). Examples of high Tg optical polymers include polyimides, benzocyclobutene, polycarbonates, imidised PMMA, polyesters, polynorbornenes, acrylates, Dupont's Polyguide™, and Akzo Nobel's Beam-Box™. Notably, the benzocyclobutene (BCB) polymer material exemplified in U.S. Pat. No. 5,914,709 is a high Tg polymer, with Tg~350° C. (L. Eldada and L. W. Shacklette "Advances in polymer integrated optics", *IEEE Journal of Selected Topics in Quantum Electronics* vol 6, pp. 54-68 (2000))

There are some examples in the art where low Tg polymers, usually siloxanes and acrylates (including fluorinated acrylates), have been used as waveguide materials Another low Tg polymer that has been used as a waveguide material is the cross-linked epoxy Norland 68. Notwithstanding the prejudice against them, cross-linked low Tg polymers can surprisingly be beneficial for optical waveguide devices, and in particular for thermo-optic devices (as disclosed in U.S. Pat. No. 6,236,774), firstly because time-dependent responses of the polymer properties (associated with viscoelastic effects) can be avoided by maintaining the device well above Tg, and secondly because the thermo-optic coefficient of a polymer is generally significantly greater above Tg than below Tg. Therefore it is advantageous for the polymer Tg to be below the minimum operating temperature of the device, so the material remains in its soft or "rubbery" state, provided mechanical integrity is retained by cross-linking. The use of polymer waveguide materials with low Tg for use in optical touch sensors is not known in the art.

In addition to having a low Tg, it is advantageous if the polymer waveguide materials are substantially non-volatile prior to being cured. In particular, it is advantageous if the polymer waveguide materials do not contain any solvent prior to being cured. To be applied to a substrate, polymer waveguide materials generally need to be in a liquid form; this can be achieved either by dissolving the material in a solvent or by using a material that is inherently liquid prior to curing. When applying a waveguide material onto a substrate by commonly used methods such as spin coating, extrusion coating, slot coating, screen printing or doctor blading, it is desirable that the rheology of the material be well controlled during the coating process. Although low volatility solvents are routinely used, the potential remains for the solvent to continually evaporate during the coating process, inevitably changing the rheology and hence making the coating process difficult to control. On the other hand, a substantially non-volatile material will not experience any change in basic rheology during any sequence of coating steps, providing constant temperature is maintained. As disclosed in out co-pending applications entitled "Low volatility polymers for two-stage deposition processes", Ser. No. 11/742,224 and "Methods for fabricating polymer optical waveguides on large area substrates", Ser. No. 11/742,194 filed concurrently and incorporated herein by reference in their entirety, substantially non-volatile polymers are particularly advantageous for a two stage deposition process such as extrude-and-spin, that can be applied to the cost-effective fabrication of optical waveguides on large area substrates such as rectangular flat panels. Further advantages of using solvent-flee non-volatile waveguide materials are improved film quality over the substrate area and the avoidance of any soft bake steps that may be required to remove solvents after coating and before patterning. If polymer substrates are to be used, solvent-free polymer materials have yet another advantage in that there need not be any concern about whether the substrate will be attacked by a solvent in the material. Although some polymer substrate materials such as polyimide, PEN and PET are known to have good solvent resistance, others such as polycarbonate, acrylic and polystyrene do not. Solvent-flee polymer waveguide materials have been described previously (see for example DuPont's Polyguide™ material system (U.S. Pat. Nos. 5,402,514 and 5,292,620), Corning's multi-functional acrylates (U.S. Pat. No. 6,555,288) and AlliedSignal's multi-functional vinyl ethers (U.S. Pat. No. 6,308,001)), but the majority of known polymer waveguide materials, including polymethyl methacrylate and poly(α-methylstyrene) (U.S. Pat. No. 4,749,245), polydiacetylenes (U.S. Pat. No. 4,824,522), polyaciylates and polysiloxanes (U.S. Pat. No. 5,062,680), polyimides (U.S. Pat. No. 6,316,589), poly(m-ethyl methacrylimide) (U.S. Pat. No. 6,327,415), benzocyclobutene (C. F. Kane and R. R. Kichnavek, "Benzocyclobutene optical waveguides", *IEEE Photonics Technology Letters* vol. 7, pp. 535-537 (1995)) and highly fluorinated polymers such as TEFLON®, CYTOP® and HYFLON® (U.S. Pat. No. 6,603,917), need to be dissolved in a solvent for processing. Notably, the benzocyclobutene polymer exemplified in U.S. Pat. No. 5,914,709 is among the group of polymer waveguide materials requiring a solvent, and would therefore be undesirable for the mass production of optical waveguides on large area substrates. The use of substantially non-volatile polymer waveguide materials, and solvent-free polymer waveguide materials in particular; for use in optical touch screen sensors is not known in the art.

There are several criteria by which a liquid material may be regarded as being "substantially non-volatile". Some criteria may involve the concepts of boiling point (at a specified pressure) or vapour pressure (at a specified temperature). Another criterion may concern the amount of weight of material lost per unit surface area in a specified period of time at a specified temperature and pressure. For the purposes of this invention, the volatility of a liquid material will be defined according to three criteria: boiling point at 760 mmHg pressure (ie. 1 atm); vapour pressure at 20° C.; and the temperature at which the vapour pressure exceeds 1 mmHg. Note that boiling point and vapour pressure are related—at a given pressure (say 760 mmHg), a liquid will boil when its vapour pressure reaches that pressure. Generally, boiling point is the simplest criterion for comparing the volatility of different liquids, because it is readily observable unless the liquid decomposes before boiling. The boiling point of a liquid will usually be listed amongst its physical properties. Comparisons on the basis of vapour pressure can be more difficult because vapour pressure data is not always readily available, and may not always be quoted at the same temperature.

A variety of solvents have been used to dissolve polymer materials for spin coating, including chloroform, benzene and toluene (U.S. Pat. No. 4,749,245), dimethyl cyclohexane (U.S. Pat. No. 4,824,522), methyl isobutyl ketone (MIBK, U.S. Pat. No. 5,062,680), N,N-dimethyl acetamide (DMA, U.S. Pat. No. 6,316,589), 2-methoxy ethyl acetate (U.S. Pat. No. 6,603,917) and ethyl lactate (U.S. Pat. No. 7,030,039). In recent years, cyclopentanone, cyclohexanone and propylene glycol monomethyl ether acetate (PGMEA) have become popular spin coating solvents Selected boiling point and vapour pressure data for these solvents, where available, are presented in Table 1

TABLE 1

| Solvent | Boiling point at 1 atm pressure (° C.) | Vapour pressure at 20° C. (mmHg) | Temperature at which vapour pressure is 1 mmHg (° C.) |
| --- | --- | --- | --- |
| Chloroform | 61.3 | 159 | −58.0 |
| Benzene | 80.1 | 74.6 | −36.7 |
| Toluene | 110.6 | 22 | −26.7 |
| MIBK | 119 | 15 | −1.4 |
| Dimethyl cyclohexane | 124 | not available | not available |
| Cyclopentanone | 130-131 | 11.4 (at 25° C.) | not available |
| 2-methoxy ethyl acetate | 145 | not available | not available |

TABLE 1-continued

| Solvent | Boiling point at 1 atm pressure (° C.) | Vapour pressure at 20° C. (mmHg) | Temperature at which vapour pressure is 1 mmHg (° C.) |
| --- | --- | --- | --- |
| PGMEA | 145-146 | 3.7 | not available |
| Ethyl lactate | 154 | 2 | not available |
| Cyclohexanone | 155 | 2 | 1.4 |
| DMA | 164.5-166 | not available | not available |

Since all of these solvents have a boiling point below 175° C., one possible criterion for a liquid material to be "substantially non-volatile" is that it be flee from any components boiling at less than 175° C. at 760 mmHg, preferably free from any components boiling at less than 225° C. at 760 mmHg, and most preferably flee from any components boiling at less than 275° C. at 760 mmHg. Alternatively, a substantially non-volatile liquid material may be defined as one that has a vapour pressure of less than 0.5 mmHg at 20° C., preferably less than 0.1 mmHg at 20° C., and most preferably less than 0.01 mmHg at 20° C. Alternatively, a substantially non-volatile liquid material may be defined as one whose vapour pressure exceeds 1 mmHg only when the temperature exceeds 25° C., preferably when the temperature exceeds 50° C., and most preferably when the temperature exceeds 75° C.

A substantially non-volatile curable polymer system is typically made up of low molecular weight polymer chains known as oligomers, bearing curable functions such as epoxy groups or ethylenically unsaturated groups. The molecular weight of a liquid polymer is closely correlated with its viscosity, and if the viscosity is too high (ie. the molecular weight is too high), then the polymer cannot be deposited on a substrate to form an optical quality film; it is for this reason that most optical and photoresist polymers known in the art need to be diluted with a solvent. On the other hand, if the molecular weight of the oligomers in a substantially non-volatile polymer is too low, then each chain will contain insufficient curable functions for effective curing to occur. It will be appreciated then that a substantially non-volatile curable polymer system will have a preferred viscosity range, typically 100-10,000 cP, more preferably 500-5,000 cP and most preferably 1,000-4,000 cP. Since viscosity often correlates strongly with temperature, these preferred viscosities refer to the temperature at which the process steps are carried out, usually room temperature.

UV curable siloxane polymers are a particularly suitable class of materials for preparing waveguides, potentially with low Tg (depending on the composition). In particular, they can be processed without a solvent, and consequently are substantially non-volatile. They may be synthesised for example by a condensation reaction as disclosed in U.S. Pat. Nos. 6,800,724, 6,818,721 or 6,965,006, incorporated herein by reference in their entirety. Siloxane polymers have excellent adhesion to a variety of substrate materials, including silicon, glass and polymers.

Volatility data for some standard siloxane polymers will now be presented, to demonstrate that siloxane polymers synthesised by the reactions disclosed in U.S. Pat. Nos. 6,800,724, 6,818,721 and 6,965,006 are highly likely to satisfy the "substantially non-volatile" criteria described above in relation to Table 1. The most commonly available siloxane polymers, for which volatility data are available in the literature, are linear methyl-substituted siloxanes, ie with each silicon atom bearing two or three methyl groups. Table 2 presents volatility data for linear methyl-substituted siloxanes with up to eleven silicon atoms (note that "Me" signifies a methyl group, $CH_3$—)

TABLE 2

| Siloxane type | Structure | Molecular weight | Boiling point at 1 atm pressure (° C.) | Temperature at which vapour pressure is 1 mmHg (° C.) | Vapour Pressure at 20° C. (mmHg) |
|---|---|---|---|---|---|
| Tetrasiloxane | Me—(Si(Me$_2$)O)$_3$—SiMe$_3$ | 310.7 | 193.5 | 35.3 | 0.45 |
| Pentasiloxane | Me—(Si(Me$_2$)O)$_4$—SiMe$_3$ | 384.9 | 220.5 | 56.6 | 0.0525 |
| Hexasiloxane | Me—(Si(Me$_2$)O)$_5$—SiMe$_3$ | 459.0 | 245.5 | 73.7 | 0.0075 |
| Octasiloxane | Me—(Si(Me$_2$)O)$_7$—SiMe$_3$ | 607.3 | 290.0 | 105.8 | 0.0003 |
| Nonasiloxane | Me—(Si(Me$_2$)O)$_8$—SiMe$_3$ | 681.5 | 307.5 | 144.0 | not available |
| Decasiloxane | Me—(Si(Me$_2$)O)$_9$—SiMe$_3$ | 755.7 | 314.0 | 160.3 | not available |
| Hendecasiloxane | Me—(Si(Me$_2$)O)$_{10}$—SiMe$_3$ | 829.8 | 322.8 | 175.2 | not available |

Inspection of the boiling point data in Table 2 shows that methyl-substituted siloxanes of even modest chain length, that would generally be regarded as oligomers rather than polymers, have boiling points in excess of 175° C. For the purposes of the present invention, and in contrast to the solvents listed in Table 1 above, these methyl-substituted siloxanes would be regarded as substantially non-volatile. Equally, they would be regarded as substantially non-volatile because they have a vapour pressure of 1 mmHg only at temperatures that exceed 20° C. They would also be regarded as substantially non-volatile because they have a vapour pressure of below 0.5 mmHg at 20° C. Indeed once the number of repeat units reaches 5, with a molecular weight of 384.9, the vapour pressure is below 0.1 mmHg at 20° C. It will be appreciated by those skilled in the art that siloxane polymers or oligomers with higher molecular weights will have lower vapour pressure. Since siloxane polymers synthesised by routes disclosed in U.S. Pat. Nos. 6,800,724, 6,818,721 or 6,965,006 invariably have molecular weights in excess of 500, and typically above 1000, it is cleat that, as defined in this specification, they will be substantially non-volatile.

Finally, we refer to several instances in the patent literature where siloxane polymers (also known as silicones) are regarded as being non-volatile: U.S. Pat. No. 3,935,133; US 2001/0031269; U.S. Pat. No. 6,685,921; and US 2004/0209784.

A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propane-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino)benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used. For example, Irgacure 1000 is a mixture of 80% Darocur 1173 and 20% Irgacure 184 . For thermal curing, organic peroxides in the form of peroxides (eg. dibenzoyl peroxide), peroxydicarbonates, peresters (t-butyl perbenzoate), perketals, hydroperoxides, as well as AIBN (azobisisobutyronitrile), may be used as initiators. The initiator may be present at a level from 0.01% to 10% by weight of the overall composition, more preferably from 0.5% to 4% by weight of the overall composition. A liquid initiator is generally preferred, for ease of mixing into the curable material. However certain solid initiators may also be soluble in the curable material, without addition of a solvent. Other additives, such as stabilisers, plasticisers, contrast enhancers, dyes or fillers may be added to enhance the properties of the polymer as required.

Thin films of polymer material suitable for waveguide fabrication by photo-patterning or moulding can be deposited onto a substrate by a variety of methods, including spin coating, dip coating, meniscus coating, extrusion coating and slot coating. These thin films can then be photo-patterned with light either through a mask, eg. in a mask aligner or stepper; or by a laser direct writing procedure; exposure through a mask is generally preferred for high fabrication throughput.

Methods of forming and patterning waveguides are described in our co-pending US Patent Application No. 2005/0089298, the contents of which are incorporated herein by reference. Suitable polymers are disclosed in U.S. Pat. No. 6,818,721.

Devices of the present invention may be prepared by direct patterning of a light transmissive portion on a flexible substrate. Alternatively, a substrate may be laid down on a support, with or without an intermediate release layer, and a light transmissive layer applied to the substrate, prior to the substrate being peeled from the support.

The deposited polymer is preferably curable by actinic radiation, preferably UV radiation. Apart from UV light, several types of actinic radiation suitable for curing photo-curable polymers are known in the art, including X-rays, visible light and electron beams and are suitable for the present invention. When using a fabrication method based on photo-patterning and wet etching, the curing advantageously causes a solubility change exploited with a developing solvent, to remove unexposed material. Alternatively, when using a moulding-based fabrication method, the polymer can advantageously be cured through the mould prior to release. When using a fabrication method based on direct dispense, the polymer is advantageously cured after being dispensed onto the substrate. The polymer is preferably a siloxane polymer (a polymer with an alternating Si—O backbone), preferably synthesised by a condensation reaction as disclosed in U.S. Pat. Nos. 6,800,724, 6,818,721 or 6,965,006, and preferably containing ethylenically unsaturated substituents. The ethylenically unsaturated substituents on photo-curable siloxane polymers may for example be methacrylate groups, styrene groups (as in U.S. Pat. No. 6,727,337, the contents of which are also incorporated herein by reference) or some other group capable of undergoing free radical addition polymerisation.

In one preferred form, a polymer used in the present invention is a siloxane synthesised by a method disclosed in U.S. Pat. No. 6,800,724 involving the steps of: acidolysis of a metal alkoxide compound with an acid to produce an intermediate acidolysed solution; and condensation of the intermediate solution in the presence of a metal alkoxide compound to produce the metal alkoxide polymer. Generally the metal alkoxide compounds used in the respective acidolysis and condensation steps are different, but they may be the same. Preferably the acidolysis and condensation steps are performed without addition of water. Acid is consumed in the acidolysis reaction. Preferably the metal alkoxide compounds are organically modified. More preferably at least 25% of the metal alkoxide compounds used in the acidolysis and/or condensation steps are organically modified. An organically modified metal alkoxide compound is one that includes at least one metal to carbon bond that is unaffected during acidolysis and condensation steps. Preferably the metal alkoxide compound(s) have the general formula:

$$R^1_n M(OR)_{V-n} \quad (1)$$

where M is a metal of valence V, n is an integer from 0 to (V-1); R is a short chain alkyl group with 1 to 6 carbon atoms; and $R^1$ is an alkyl or aryl group containing from 1 to 20 carbon atoms. The alkyl or aryl group $R^1$ may have substituents including species such as alkenyl, allyl, alkacryloxy, acryloxy or epoxy groups, which can be polymerised either photolytically or thermally to form an organic network, as well as halogen, amino, mercapto, cyano, nitro, amido and hydroxy groups. If more than one $R^1$ group is present, the $R^1$ groups may or may not be identical. Preferably at least one of the metal alkoxide compounds should have n greater than zero, that is have at least one M-C bond, and said compounds should make up at least 25% of the total number of metal alkoxide species. Preferably the metal alkoxide compound(s) are alkoxides of silicon, zirconium, titanium, germanium and/or aluminum. Preferably the acid is an inorganic acid such as boric or phosphoric acid or a carboxylic acid such as formic, acetic or oxalic acid. More preferably the acid is of an element that has a glass forming or glass modifying oxide, and has a pKa greater than about 2. Preferably the molar ratio of the acid to the metal alkoxide compound in the acidolysis step is from 1:5 to 10:1.

Preferably the acidolysis of the metal alkoxide compound is performed in the presence of a mutual solvent, for example an alcohol such as methanol. Note that this mutual solvent is removed after the polymer has been synthesised; consequently the polymer is solvent-free and substantially non-volatile at the time of film deposition.

In another preferred form of the present invention, the polymer is prepared by a process disclosed in U.S. Pat. No. 6,818,721, which comprises reacting together: (A) at least one silicon containing compound having at least one silanol group; and (B) at least one silicon containing compound having at least one —OR group wherein R represents an alkyl group having from 1 to 8 carbon atoms, or an alkoxyalkyl group having from 2 to 8 carbon atoms in the presence of (C) a calcium or magnesium catalyst selected to allow the reaction to proceed and (D) at least one solvent. The organosilicon condensate is a siloxane, and most preferably a polysiloxane.

Compounds (A) and (B) may independently be monomeric, dimeric, oligomeric or polymeric compounds. The at least one silicon containing compound (A) is advantageously a silanol having between one and three unsubstituted or substituted hydrocarbon groups having from 1 to 18 carbon atoms, or alternatively may be described as a silanol with between one and four OH groups A silanol with four OH groups is, in its simplest form silicic acid. Preferably, the silanol is diphenyl silanediol. The silanol may also bear a cross-linkable group, for example, a double bond of the acrylate, methacrylate or styrene type. Another suitable cross-linkable group is an epoxide group. In one preferred embodiment, the at least one silicon containing compound having at least one —OR group (B) is a monomeric compound with the general formula:

$$G_y Si(OR)_{4-y} \quad (2)$$

wherein y has a value of 0, 1, 2 or 3, G represents a unsubstituted or substituted hydrocarbon group having from 1 to 18 carbon atoms; and R represents an alkyl group having from 1 to 8 carbon atoms or an alkoxyalkyl group having from 2 to 8 carbon atoms. Preferably, the at least one silicon containing compound (B) is an alkoxysilane, which has from one to four alkoxy groups inclusive. Preferably, the alkoxy group (OR) is selected from the group consisting of methoxy, ethoxy, n-propoxy, i-propoxy, n-butoxy, i-butoxy and t-butoxy.

Like the silanol, the alkoxy silane may also bear a cross-linkable group, for example, a double bond of the acrylate, methacrylate or styrene type. Another suitable cross-linkable group is an epoxide group. Preferably, the cross-linkable group is on G, but it may be on OR. Note that the solvent (D) is removed after the polymer has been synthesised; consequently the polymer is solvent-free and substantially non-volatile at the time of film deposition.

In yet another preferred form of the present invention, as disclosed in U.S. Pat. No. 6,727,337, the siloxane is produced by condensation of one or more silanediols of formula (3) and/or derived precondensates thereof (3)

with one or more silanes of formula (4) and/or derived precondensates thereof (4)

wherein $Ar^1$ and $Ar^2$ are independently groups with 3 to 20 carbon atoms and at least one aromatic or heteroaromatic group and at least one of $Ar^1$ and $Ar^2$ bears a cross-linkable functional group; and $R^1$, $R^2$, $R^3$ and $R^4$ are independently alkyl, aralkyl or aryl with up to 20 carbon atoms Preferably the ratio of formula (3) and formula (4) is about 1:1.

Such a polycondensate has the structure (5)

wherein $Ar^1$ and $Ar^2$ are independently groups with 3 to 20 carbon atoms and at least one aromatic or heteroaromatic group and at least one of $Ar^1$ and $Ar^2$ bears a cross-linkable group; $R^1$ and $R^2$ are independently alkyl, aralkyl or aryl with up to 20 carbon atoms; and q is at least 1 . $Ar^1$ and $Ar^2$ may preferably have 5 to 20 carbon atoms.

EXAMPLE 1

This example demonstrates the fabrication of a polymer optical waveguide array on a standard silicon substrate, using a solvent-free, low Tg polymer system processed with a photolithography/wet etch technique. Following the procedure disclosed in U.S. Pat. No. 6,818,721, a lower refractive index polymer A was prepared with a viscosity of 2500 cP (at 20° C.) and a refractive index (measured at 20° C. on an Abbé refractometer with loom light) of 1.483. A higher refractive index polymer B was prepared with a viscosity of 2200 cP (at 20° C.) and a refractive index of 1.509 (at 20° C.) A suitable photo-initiator was added to both polymer A and polymer B, without the presence of any solvent.

Polymer A was spin coated onto a 5" diameter silicon wafer and cured with UV light from a mercury lamp, to form a lower cladding layer with thickness 20 μm, refractive index 1.485 (at 20° C. and 850 nm) and a Tg of <10° C. Polymer B was spin coated onto the lower cladding layer to form a core layer, and patterned with UV light through a mask; the unexposed polymer B material was then dissolved in isopropanol to form an array of parallel waveguides. The exposed core layer had thickness 11 μm, refractive index 1.513 (at 20° C. and 850 nm) and a Tg of <10° C. Optionally, an upper cladding layer of polymer A can be deposited and cured in a similar manner to the lower cladding layer.

EXAMPLE 2

This example demonstrates the fabrication of a polymer optical waveguide array on a large area polymer substrate, using a solvent-free, low Tg polymer system processed with a photolithography/wet etch technique. Lower refractive index polymer A and higher refractive index polymer B were prepared as in Example 1 . Polymer A was extruded onto a 400 mm×500 mm×175 μm polycarbonate sheet using a FAStar Advantage III Extrusion Coating System to form a layer 25 μm thick, then transferred to a spinner where it was further planarised (and thinned) by spinning at 1500 rpm for 15 seconds. The planarised film was cured with UV light from a mercury lamp in a Tamarack PRX8000 flood illuminator to form a lower cladding layer 20 μm thick. Polymer B was deposited onto the lower cladding layer by an identical extrude and spin process to form a core layer 11 μm thick, and imagewise exposed to UV light through a mask in a Tamarack model 303 photolithography tool. Unexposed polymer B material was then dissolved in isopropanol to leave exposed material in the form of an array of parallel waveguides. An upper cladding layer of polymer A was deposited and cured in a similar manner to the lower cladding layer. The completed optical waveguide array was highly flexible, able to be bent repeatedly and reversibly through 180° with a radius of curvature of about 2 mm.

EXAMPLE 3

This example demonstrates the fabrication ot a polymer optical waveguide array on a large area polymer substrate, using a solvent-free, low Tg polymer system processed with a moulding technique.

To produce the mould, a layer of photoresist was spin coated onto a 400 mm×500 mm glass sheet and imagewise exposed to UV light (through the same mask used to pattern the polymer B layer in the previous example) in a Tamarack 303 photolithography tool. Unexposed photoresist was dissolved in isopropanol to produce a master with the desired waveguide pattern. Polydimethylsiloxane (PDMS) was cast onto the master, cured and peeled off to form the mould. PDMS is a preferred material for producing the mould, because it has low surface energy (ie. it does not stick to most materials) and is transparent to UV light.

Lower refractive index polymer A and higher refractive index polymer B were prepared as in Example 1. Polymer A was extruded onto a 400 mm×500 mm×175 μm polycarbonate sheet using a FAStar Advantage III Extrusion Coating System to form a layer 25 μm thick, then transferred to a spinner where it was further planarised (and thinned) by spinning at 1500 rpm for 15 seconds. The planarised film was cured with UV light from a mercury lamp in a Tamarack PRX8000 flood illuminator to form a lower cladding layer 20 μm thick. Polymer B was deposited onto the lower cladding layer by an identical extrude and spin process to form a core layer 11 μm thick. The PDMS mould was then applied to the polymer B layer, the polymer cured with UV light in the Tamarack PRX8000 flood illuminator, and the PDMS mould peeled off for future use. An upper cladding layer of polymer A was deposited and cured in a similar manner to the lower cladding layer. The completed optical waveguide array was highly flexible, able to be bent repeatedly and reversibly through 180° with a radius of curvature of about 2 mm.

EXAMPLE 4

Figure 4A:
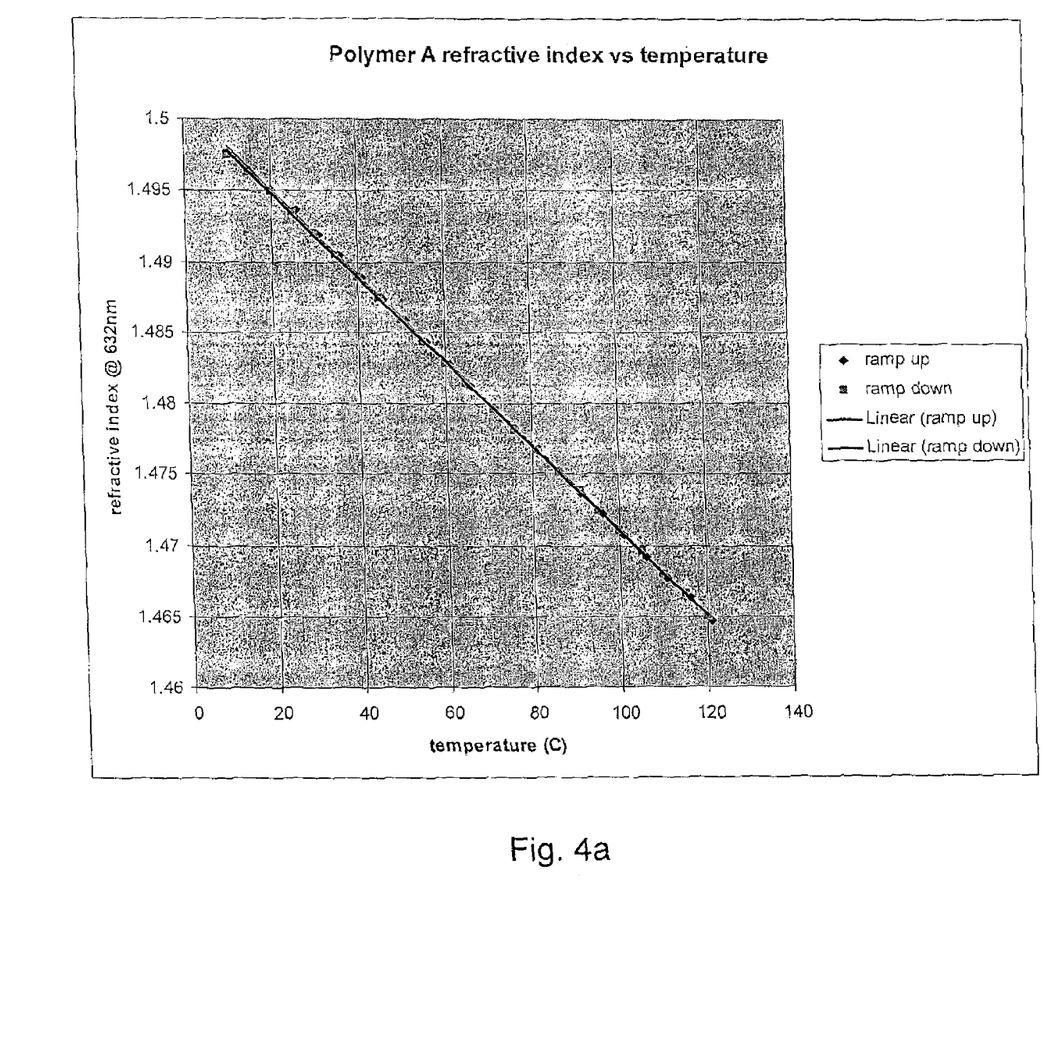
FIGS. 4a and 4b show plots of refractive index as a function of temperature for two specific siloxane polymers.
Figure 4B:
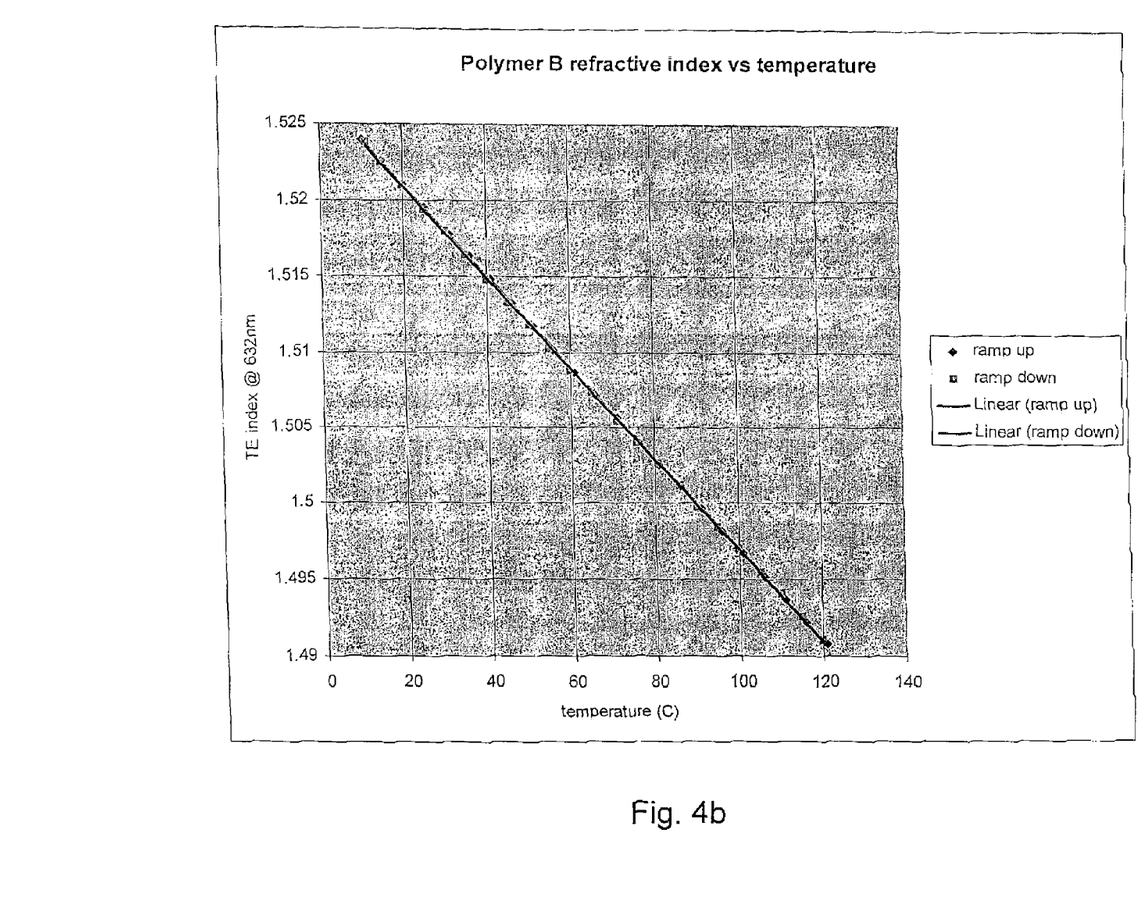

This example demonstrates the low Tg property of material produced from cured lower refractive index polymer A and cured higher refractive index polymer B. Lower refractive index polymer A was prepared as in Example 1, spin coated onto a 5" diameter silicon wafer and cured with UV light from a mercury lamp, to form a layer with thickness 22 μm. Likewise, polymer B was spin coated onto a 5" diameter silicon wafer and cured to form a layer with thickness 16 μm. Using a Film Tek 4000 film characterisation tool equipped with a heating stage, the refractive indices of the polymer A and polymer B layers were measured over a temperature range of 10 to 120° C., and plotted in FIGS. 4a and 4b . It can be seen that both polymers A and B have a completely linear refractive index vs temperature relationship, with no evidence of a glass transition in the 10 to 120° C. range. Similar measurements up to 250° C. (approaching the thermal stability limit) likewise revealed no evidence of a glass transition, implying that Tg for these materials must be below 10° C. It is most unlikely that Tg for these polymers would be above 250° C.

The following three examples will describe certain configurations of a waveguide-based optical touch screen sensor where it is advantageous for the waveguide arrays to be flexible. It will be appreciated that the combination of low Tg polymer optical materials with polymer substrates is eminently suitable for this purpose. In each case the required arrays are fabricated using the low Tg polymers of example 1 and the polycarbonate substrates and methods of examples 2 or 3

EXAMPLE 5

In this example the allays of transmit waveguides and receive waveguides, with their respective in-plane lenses, are arranged on L-shaped portions of the substrate as shown in FIG. 1. During assembly of the touch screen device of FIG. 1, it will be appreciated that the 1×N splitter 18 at the edge of the L-shaped substrate 19 has to be aligned with the emissive portion of the light source 11, and similarly the end portions of the receive waveguides 16 have to be aligned with the elements of the multi-element detector 17. It will be further appreciated that these alignment procedures may require the waveguide/substrate assemblies to be flexed out of plane.

EXAMPLE 6

Figure 5:
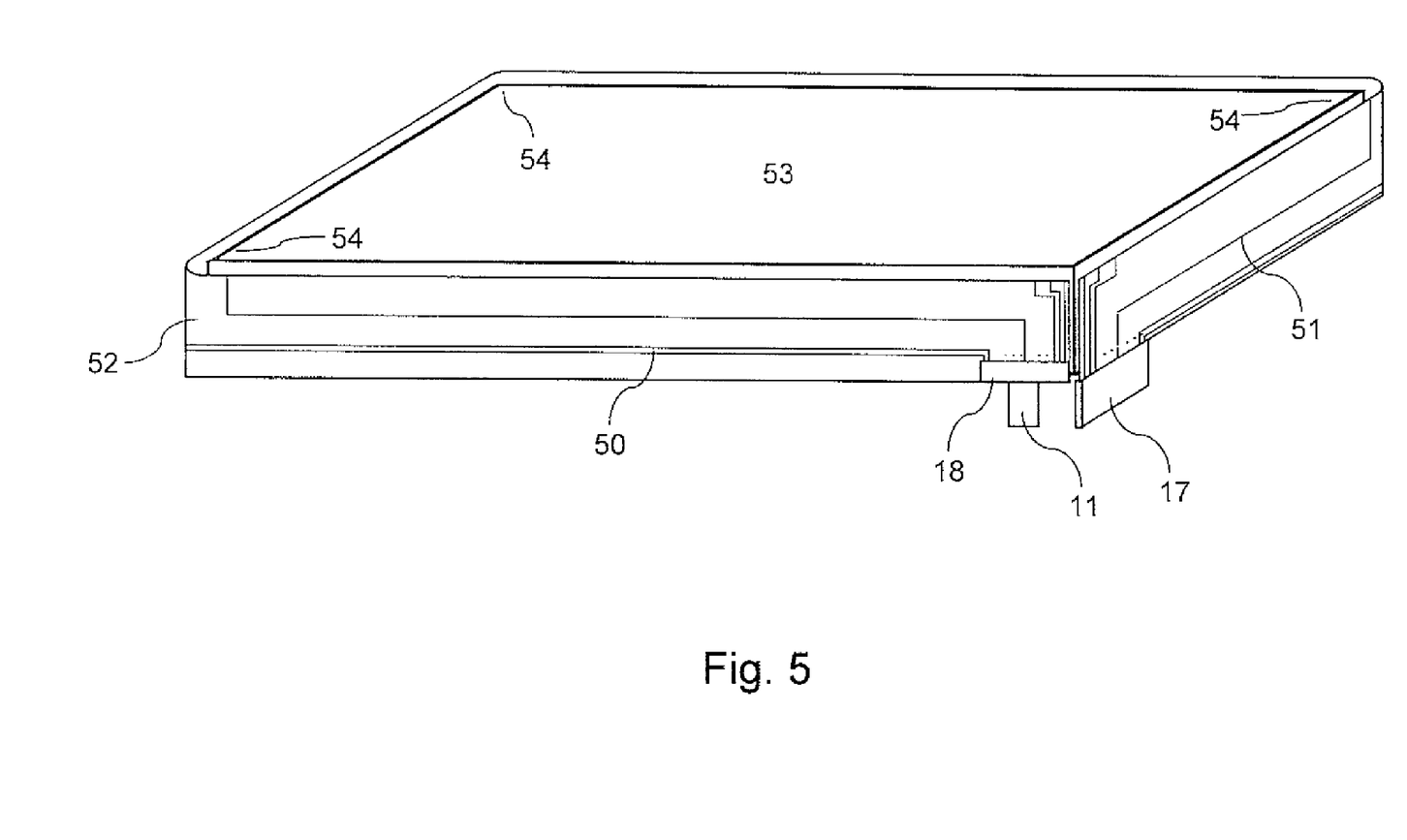
FIG. 5 shows a perspective view of a waveguide-based optical touch screen sensor with a wrap-around waveguide configuration.

In this example the allays of transmit and receive waveguides are arranged in a 'wrap around' configuration disclosed in Australian provisional patent application No 2006905255, entitled 'Waveguide configurations for optical touch systems' and incorporated herein by reference in its entirety. As shown in FIG. 5, the transmit waveguides 50 and receive waveguides 51, with their respective in-plane lenses (not shown), are fabricated on an elongated strip of substrate material 52 that is folded around the perimeter of a display 53. As in the configuration shown in FIG. 1 and described in example 5, the 1×N splitter 18 receives light from a light source 11 and the light from the receive waveguides 51 is detected by the elements of the multi-element detector 17. As discussed in the abovementioned Australian provisional patent application No 2006905255, this type of 'wrap around' configuration significantly reduces the bezel width required around the display 53, compared to the configuration shown in FIG. 1. It will be appreciated that this configuration requires the waveguide/substrate assembly to be bent through 90° with a small radius of curvature at the three corners 54 of the display 53.

EXAMPLE 7

In this example the arrays of transmit and receive waveguides are laid out on four elongated strips of substrate material, two each for the transmit waveguide arrays and two each for the receive waveguide allays, which are then folded around the edges of a display 33 as shown in FIG. 3. As discussed previously, this type of 'folded' configuration significantly reduces the bezel width required around the display, compared to the configuration shown in FIG. 1.

The invention has been described by reference to certain preferred embodiments; however it should be understood that it may be embodied in other specific forms or variations thereof without departing from its spirit or essential characteristics. The embodiments described above are therefore considered to be illustrative in all respects and not restrictive, the scope of the invention being defined by the appended claims rather than by the foregoing description.

What we claim is:

1. An optical waveguide when used as a component of an optical touch screen sensor, the waveguide comprising a light guiding portion on a substantially flexible substrate, wherein the light guiding portion is composed of a polymer with Tg below an operating temperature of the optical touch screen sensor.

2. An optical waveguide according to claim 1 wherein the operating temperature of the optical touch screen sensor is in the range 0° C. - 50° C.

3. An optical waveguide according to claim 2 wherein the operating temperature of the optical touch screen sensor is in the range 0° C. -35° C.

4. An optical waveguide according to claim 1 wherein the light guiding portion is composed of a polymer with Tg below 100° C., preferably below 50° C., more preferably below 25° C., and most preferably below 10° C.

5. An optical waveguide according to claim 1 wherein the optical waveguide can be bent repeatedly and reversibly through 180° with a radius of curvature that is less than 100 cm, preferably less than 10 cm, more preferably less than 1cm, and most preferably less than 2 mm.

6. An optical waveguide according to claim 1 wherein the substrate is a polymer substrate.

7. An optical waveguide according to claim 6 wherein the light guiding portion is composed of a polymer with Tg lower than a Tg of the polymer substrate.

8. An optical waveguide according to claim 6 wherein the polymer substrate has a Tg above 80° C., preferably above 150° C. and most preferably above 350° C.

9. An optical waveguide according to claim 1 wherein the light guiding portion is formed by depositing a curable liquid polymer material onto the substrate, and curing it to form a cross-linked polymer material.

10. An optical waveguide according to claim 9 wherein the curable liquid polymer material is substantially non-volatile.

11. An optical waveguide according to claim 10 wherein the curable liquid polymer material does not contain any solvent.

12. An optical waveguide according to claim 9 wherein the curable liquid polymer material is cured by a UV initiated free radical polymerisation.

13. An optical waveguide according to claim 9 wherein the curable liquid polymer material is processed by a method selected from the group consisting of UV lithography/wet etching and moulding.

14. An optical waveguide according to claim 1 wherein the polymer light guiding portion is 0.5 µm to 250 µm in thickness, preferably 3 µm to 50 µm in thickness and most preferably 5 µm to 25 µm in thickness.

15. An optical waveguide according to claim 1 wherein the substrate is 25 µm to 1 mm in thickness, preferably 75 µm to 250 µm in thickness, and most preferably about 175 µm in thickness.

16. An optical waveguide according to claim 1 further comprising a lower cladding between said polymer light guiding portion and said substrate.

17. An optical waveguide according to claim 1 further comprising an upper cladding in contact with at least a portion of said polymer light guiding portion.

18. An optical waveguide when used as a component of an optical touch screen sensor, the waveguide comprising a light guiding portion on a substantially flexible substrate, wherein the light guiding portion is composed of a polymer with Tg below an operating temperature of the optical touch screen sensor and wherein the light guiding portion is formed by depositing a substantially non-volatile curable liquid siloxane polymer onto the substrate, and curing it to form a cross-linked siloxane polymer.

19. An optical waveguide according to claim 18 wherein the light guiding portion is composed of a polymer with Tg below 50° C., more preferably below 25° C., and most preferably below 10° C.

* * * * *